United States Patent
Park

(10) Patent No.: US 6,214,501 B1
(45) Date of Patent: Apr. 10, 2001

(54) METHOD FOR COATING PHOSPHOR PARTICLES, PHOSPHOR THERETHROUGH AND DRY ELECTROPHOTOGRAPHIC SCREENING PROCESS USING THEM FOR A CRT

(75) Inventor: Young Ho Park, Taegu-shi (KR)

(73) Assignee: Orion Electric Co., Ltd., Kyungsangbuk-do (KR)

( * ) Notice: Subject to any disclaimer, the term of this patent is extended or adjusted under 35 U.S.C. 154(b) by 0 days.

(21) Appl. No.: 09/380,367

(22) PCT Filed: Dec. 31, 1997

(86) PCT No.: PCT/KR97/00285

§ 371 Date: Aug. 31, 1999

§ 102(e) Date: Aug. 31, 1999

(87) PCT Pub. No.: WO99/33933

PCT Pub. Date: Jul. 8, 1999

(51) Int. Cl.[7] ............................... C09K 11/02; H01S 9/22
(52) U.S. Cl. .......................................... 430/23; 252/301.36
(58) Field of Search .................................. 430/23, 26, 29, 430/31, 107, 110, 120; 252/301.36

(56) References Cited

U.S. PATENT DOCUMENTS

| 4,297,681 | * | 10/1981 | Dircksen | 340/366 F |
| 4,420,444 | * | 12/1983 | Yamada et al. | 264/21 |
| 4,990,417 | * | 2/1991 | Inada et al. | 430/28 |
| 5,474,866 | * | 12/1995 | Ritt et al. | 430/23 |

FOREIGN PATENT DOCUMENTS

0375229 * 6/1990 (EP) .

* cited by examiner

Primary Examiner—John A. McPherson
(74) Attorney, Agent, or Firm—Notaro & Michalos P.C.

(57) ABSTRACT

A method for coating phosphor particles with polymers improves chargeability for use of these particles in CRT screens. The method includes injecting the phosphor particles into a reactor with the use of hexane as the solvent and styrene as a monomer. The particles are agitated and kept hot in the reactor. AIBN is injected into the reactor as a first, second and third catalyst, at one hour intervals. After injecting the third catalyst, a co-catalyst dissolved in hexane is also injected into the reactor. The co-catalyst is cobalt naphthalate. The method then includes cooling, drying, shattering and filtering the particles.

7 Claims, 2 Drawing Sheets

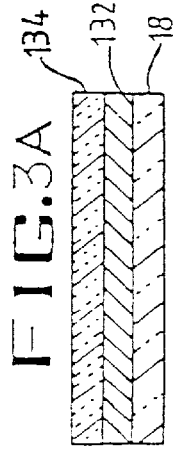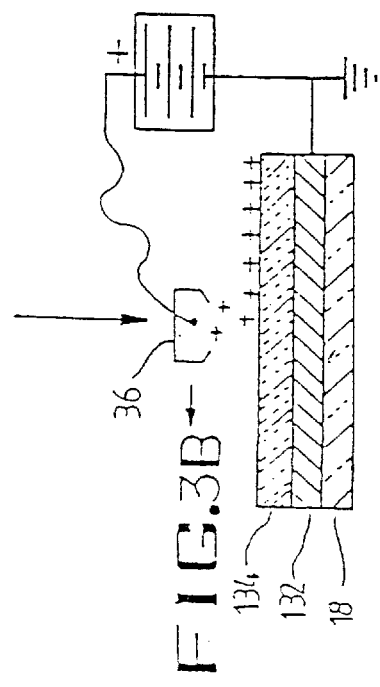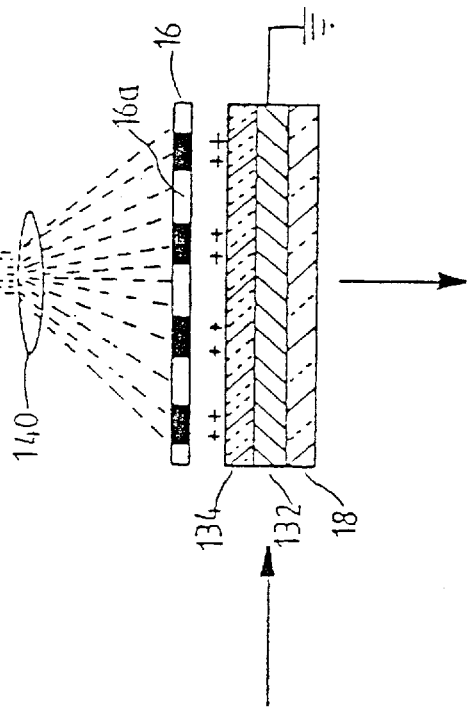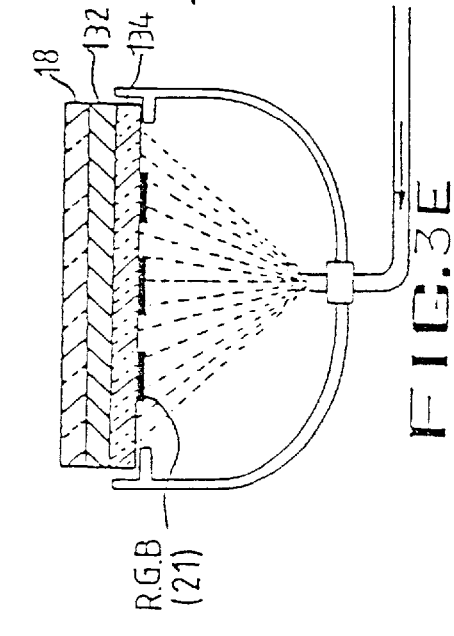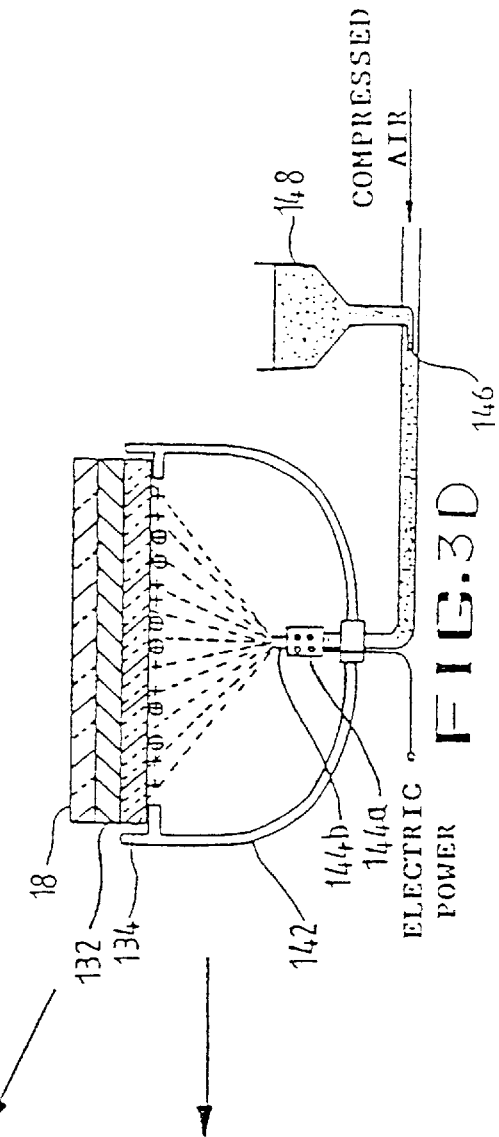

METHOD FOR COATING PHOSPHOR PARTICLES, PHOSPHOR THERETHROUGH AND DRY ELECTROPHOTOGRAPHIC SCREENING PROCESS USING THEM FOR A CRT

FIELD OF THE INVENTION

The present invention relates to a method for coating phosphor particles, phosphor particles therethrough and dry electrophotographic screening process using them for a CRT, more particularly to a method for coating phosphor particles easily and uniformly with high-molecular polymers in order to improve chargeability thereof and to improve developing characteristics thereof onto a photoconductive film, phosphor particles therethrough and dry electrophotographic screening process using them for a CRT.

BACKGROUND OF THE INVENTION

Referring to FIG. 1, a color CRT 10 generally comprises an evacuated glass envelope consisting of a panel 12, a funnel 13 sealed to the panel 12 and a tubular neck 14 connected by the funnel 13, an electron gun 11 centrally mounted within the neck 14 and a shadow mask 16 removably mounted to a sidewall of the panel 12.

A three color phosphor screen 20 is formed on the inner surface of a display window or faceplate 18 of the panel 12. The electron gun 11 generates three electron beams 19a or 19b. Said beams are directed along convergent paths through the shadow mask 16 to the screen 20 by means of several lenses of the gun 11 and a high positive voltage applied through an anode button 15 and being deflected by a deflection yoke 17 so as to scan over the screen 20 through apertures or slits 16a formed in the shadow mask 16.

In the color CRT 10, the phosphor screen 20 formed on the inner surface of faceplate 18, as shown in FIG. 2, comprises an array of three phosphor elements R, G and B of three different emission colors arranged in a cyclic order of a predetermined structure of multiple-stripe or multiple-dot shape and a matrix of light-absorptive material surrounding the phosphor elements R, G and B. And a thin conductive film of aluminum 22 overlies the screen 20 in order to provide a means for applying the uniform potential applied through the anode button 15 to the screen 20, increasing the brightness of the phosphor screen 20, preventing ions from damaging the phosphor screen 20 and preventing from decreasing the potential of the phosphor screen 20. And also, a resin film 22' such as lacquer film may be applied between the aluminum thin film 22 and the phosphor screen 20 to enhance the flatness and reflectivity of the aluminum thin film 22. The resin or lacquer film 22' is to be ignited and volatilized off after that the aluminum thin film 22 have formed onto it.

In a photolithographic wet process, which is well known as a prior art process for forming the phosphor screen 20, a slurry including phosphor particles such as phosphorus components for emission colors or light-absorptive materials is coated on the inner surface of the faceplate 18. It does not, however, meet the higher resolution demands. Moreover, it requires a lot of complicated processing steps and a lot of manufacturing equipments, thereby necessitating a high cost in manufacturing the phosphor screen 20. Also, it discharges a large quantity of effluent such as waste water, phosphor elements, 6th chrome sensitizer, etc., with the use of a large quantity of clean water.

Recently, to solve or alleviate the above problems of said photolithographic wet process, electrophotographic screening process is developed. In wet electrophotographic screening process, however, the above-mentioned problems remains unsolved. What solves or alleviates mostly the above-mentioned problems is the dry electrophotographic screening process.

U.S. Pat. No. 4,921,767, issued to Datta at al. on May 1, 1990, describes one method of electrophotographically manufacturing the phosphor screen assembly using dry-powdered phosphor particles. This invention, however, has some problems such that it requires dark environment during all the steps since the photoconductive layer is sensitive to the visual light, and that its energy consumption is so large because its fixing step comprises infrared radiation for fixing the deposited particles to the photoconductive layer.

The above problem is solved by forming the photoconductive layer with a solution sensitive to the ultraviolet radiation, which is suggested in other inventions assigned to the assignees of the present invention.

For such an example, our Korean patent application Serial No. 95-10420 filed in Apr. 29, 1995 and assigned to the assignees of the present invention describes "Method of manufacturing a screen of a CRT", as is briefly explained in the following.

FIGS. 3A through 3E schematically show various steps in the above-described manufacturing method. FIG. 3A represents a coating step that forms an electrically conductive layer 132 is formed on the inner surface of the faceplate 18 and overlies an photoconductive layer 134 on the conductive layer 132.

The conductive layer 132, for example, can be formed by conventionally applying a volatilizable organic conductive material consisting of about 1 to 50 weight % of a polyelectrolyte commercially known as Catfloc-c, available from Calgon Co., Pittsburgh, Pa., to the inner surface of the faceplate 18 in an aqueous solution containing about 1 to 50 weight % of 10% poly vinyl alcohol and drying the solution. Said conductive layer 132 serving as an electrode for the overlying photoconductive layer 134. The photoconductive layer 134 is formed by conventionally applying to the conductive layer 132, a novel photoconductive solution containing ultraviolet-sensitive material and by drying it.

An example of the ultraviolet-sensitive material can consist of 0.01 to 1 weight % of bis-1,4-dimethyl phenyl(-1,4-diphenyl(butatriene)) or 2 to 5 weight % of tetraphenyl ethylene as a donor, 0.01 to 1 weight % of at least one compound from the group including trinitro-fluorenon (TNF) and ethylanthraquinone (EAQ) as an accepter, 1 to 30 weight % of polystyrene (PS) as a polymeric binder, and balance with solvent such as toluene or xylene. The photoconductive solution is prepared by dissolving 0.01 to 1% by weight of the ultraviolet-sensitive material and 1 to 30% by weight of polystyrene as a polymeric binder in a suitable solvent such as toluene or xylene. The useful compounds as a polymeric binder also may comprise, addition to polystyrene, polyalphamethylstyrene (PαMS) polymethylmethacrylate (PMMA) and polystyrene-oxalzoline copolymer (PS-OX), et cetera.

FIG. 3B schematically illustrates a charging step, in which the photoconductive layer 134 is charged to a positive potential of less than 1 Volt, preferably above 700 volts by a corona discharger 3b. The charging step does not require a dark environment since the photoconductive layer 134 is sensitive to ultraviolet rays below about 450 nm of wave length.

FIG. 3C schematically shows an exposing step. The shadow mask 16 is inserted in the panel 12 and the positively charged photoconductive layer 134 is selectively exposed through an ultraviolet-transmissive lens system 140 and apertures or slits 16a of the shadow mask 16 to the ultraviolet rays from a ultraviolet lamp 138 with each predetermined incident angle with respect t6 each aperture or slit 16a. The charges of the exposed areas are discharged through the grounded conductive layer 132 and the charges of the unexposed areas remain in the photoconductive layer 134, thus establishing a latent charge image in a predetermined array structure. This exposing step also does not require a dark environment since the ultraviolet rays are used. Three exposures with three different incident angles of the three electron beams, respectively are required for forming a light-absorptive matrix.

FIG. 3D diagrammatically illustrates the outline of a developing step. In conventional developing step of the process such as U.S. Pat. No. 4,921,767, the charging of the dry-powdered particles such as phosphor particles or light-absorptive material is executed by a triboelectrical charging method in which surface-treated carrier beads and phosphor particles, or the carrier beads and light-absorptive material particles are mixed. On the contrary, in the invention according to Korean patent application Serial No. 95-10420 as illustrate in FIG. 3D, the dry-powered particles are suitably charged, and sprayed by compressed air toward the photoconductive layer 134. The dry-powered particles are transferred by compressed air through a venturi tube 146 from a hopper 148 to a nozzle 144b to be sprayed. Below the nozzle 144b, there is provided a discharge electrode 144a such as a corona discharger. The discharge electrode 144a charges the dry-powered particles so that the charged dry-powered particles may be sprayed from the nozzle 144b toward the photoconductive layer 134. The charged dry-powered particles are attracted to one of the areas, exposed or unexposed at said exposing step, on the photoconductive layer 134. The polarity of dry-powered particles charged by the discharge electrode 144a is determined according to on which areas the dry-powered particles are desired to be attached. That is, if the dry-powered particles are desired to be attached to the positive charged, i.e., unexposed areas, they are negatively charged by the discharge electrode 144a. While if the dry-powered particles are desired to be attached to the discharged, i.e., exposed areas, they are positively charged. And hence the dry-powered particles, which are charged positively or negatively and sprayed into the developing container 142, can be attached strong to the surface of the photoconductive layer 134 in a predetermined array pattern due to electrical attraction or repulsion.

FIG. 3E schematically illustrates a fixing step using a liquid electrostatic spray gun. In this fixing step, the surface of the photoconductive layer 134, on which the particles are attached in a predetermined array pattern at said developing step, is sprayed by solvent of petroleum such as xylene, toluene, TCE, methyl isobutyl ketone(MIBK), etc. Then, at least polymers contained in the photoconductive layer 134 are dissolved. And the dry-powdered particles, deposited on the developed areas of the photoconductive layer 134 due to electrical forces, are fixed by adhesion of said dissolved polymers. The vapor swelling method also may be used in this fixing step. In the vapor swelling method, the particles deposited on the developing areas of the photoconductive layer 134 are fixed by being applied to solvent vapor such as acetone, methyl isobutyl ketone.

The steps of charging, exposing, developing and fixing are repeated for the three different phosphor particles of R, G, and B for completing of the manufacturing a CRT. And the black matrix of light-absorptive material particles is formed according to same steps after or before the steps of forming for the three different phosphor particles.

Thus, after the patterns of phosphor particles and the matrix of light-absorptive material have been formed, the resin or lacquer film 22' is formed at a lacquer process conventionally. And then, the aluminum thin film 22 is also formed conventionally at a aluminizing process. After that, the faceplate panel 12 is baked in air at temperature of 425 degrees of centigrade for about 30 minutes. This baking process drives off the volatilizable constituents of solvents, etc., present in the conductive layer 132, the photoconductive layer 134, the respective phosphors R, G, and B, or lacquer film 22', etc. Thereby, the phosphor screen 20 is formed in array pattern of light-absorptive material 21 and three phosphor elements R, G and B as in FIG. 2.

Turning to the developing step of FIG. 3D, when the dry-powdered particles are sprayed from the nozzle 144b, they should have been sufficiently charged with a corona discharge electrode 144a. For the purpose that the particles can be sufficiently charged, the dry-powdered phosphor particles are coated with a first layer of polymethyl methacrylate and a second layer of polyacrylamide. The coating process, however, is very complicated. Also, said two coating layers of polymethyl methacrylate and polyacrylamide of the phosphor particles still do not meet the sufficient chargeability demand. And when not the discharge electrode 144a but a triboelectrical charging method is used as in the developing step described in U.S. Pat. No. 4,921,767, it is additional problem that the carrier beads are required for generating triboelectricity in addition to the coating process for the phosphor particles. Moreover, it is another problem that the developing density of deposited particles on the photoconductive layer 134 is not sufficient by the coated particles with the two layers of polymethyl methacrylate and polyacrylamide.

It is an object of the present invention to provide a method for coating phosphor particles easily and uniformly with high polymers in order to improve chargeability thereof and to improve the developing characteristics onto a photoconductive layer in a dry electrophotographic screening process for a CRT.

It is another object of the present invention to provide phosphor particles coated by the method for coating phosphor particles easily and uniformly with polymers in order to improve chargeability thereof and to improve developing characteristics onto a photoconductive film in a dry electrophotographic screening process for a CRT.

And it is yet another object of the present invention to provide a dry electrophotographic screening process for a CRT using the dry-powered phosphor particles coated by the method for coating phosphor particles easily and uniformly with high-molecular polymers in order to improve chargeability thereof and to improve developing characteristics onto a photoconductive film.

SUMMARY OF THE INVENTION

To accomplish the aforementioned purpose, the present invention provides a method for coating phosphor particles with polymers in order to improve chargeability thereof in use for manufacturing a screen inner surface of a panel of a CRT, said coating method comprising the steps of:

injecting into a reactor with hexane as a solvent, phosphor particles of about 40 to 60 weight % with respect to the solvent, and styrene as a monomer of about 20 to 30 weight % with respect to the solvent, and agitating them in the reactor;

maintaining the temperature of the reactor in 60 degrees of centigrade by heating the reactor by a heating mantle and by transferring cool water through a return current cooler mounted on the reactor;

preparing 2,2'-azobisisobutyronitrile (AIBN) as first, second and third initiators (catalysts) having same amount of about 0.02 to 0.5 weight % with respect to the monomer, injecting into the reactor with the first initiator, injecting into the reactor with the second initiator after lapse of one hour from the time of injecting the first initiator, and finally injecting into the reactor with the third initiator after lapse of two hours from the time of injecting the second initiator;

injecting co-catalyst dissolved in hexane after the third initiator is injected, co-catalyst being cobalt naphthalate of 0.01 to 0.05 weight %with respect to one of the initiator;

cooling the reactor after lapse of two hours from the injecting of the co-catalyst;

drying naturally after completion of the polymerization so as to drive off the solvent or monomers remained in the reactor;

shattering the resultant dried phosphor particles and filtering the shattered phosphor particles with a filter.

The present invention further provides phosphor particles for used in a dry electrophotographic screening process for a CRT, wherein polystyrene as high-molecular polymer is coated on the surfaces thereof. It is preferred that said phosphor particles are coated with polystyrene having an average molecular weight of 150,000 to 200,000, so that the state of coated surface may be very uniform.

The present invention still further provides a method for manufacturing a screen by dry electrophotographic screening process for a CRT, comprising the steps of forming. a volatilizable photoconductive layer on a volatilizable conductive layer coated on the inner surface of panel, charging the photoconductive layer to contain uniformly electrostatic charges, exposing the photoconductive layer selectively by a light source using a shadow mask, and developing the exposed areas of the photoconductive layer with one of first to third phosphor particles which are charged by a discharge electrode or a generator of triboelectricity, at least one kind of phosphor particles of first to third phosphor particles used at the developing step are coated with polystyrene as a high-molecular polymer on the surfaces thereof.

Said step of agitating comprises at first injecting nitrogen gas controlled in pressure by a nitrogen pressure apparatus from an nitrogen bombe, and then agitating with a mechanical stirrer; the step of shattering is executed by a ball milling machine; and the step of filtering uses a filter of 100 mesh.

DETAILED DESCRIPTION OF THE PREFERRED EMBODIMENT

Figure 1:
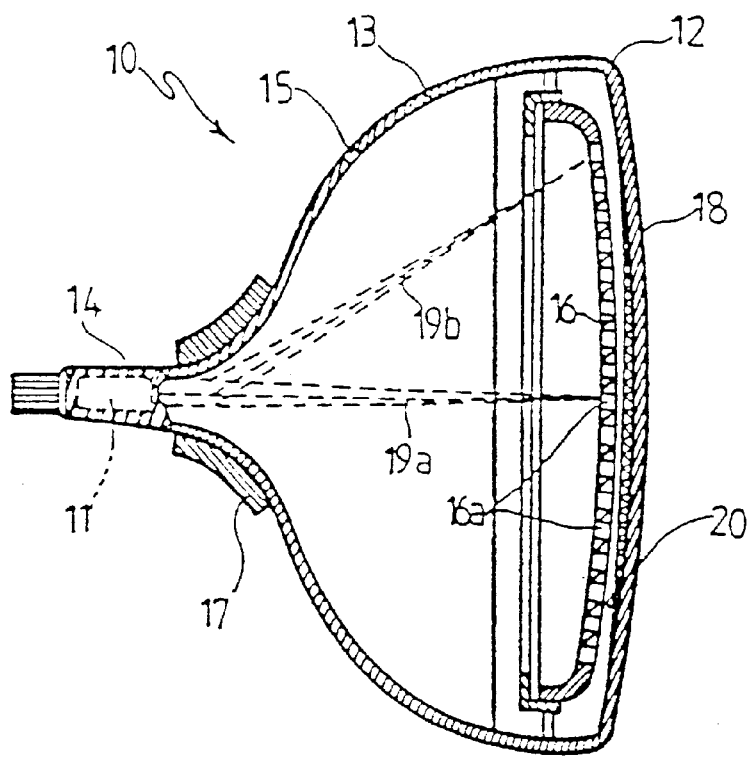
FIG. 1 is a plan view partially in axial section of a color cathode-ray tube.
Figure 2:
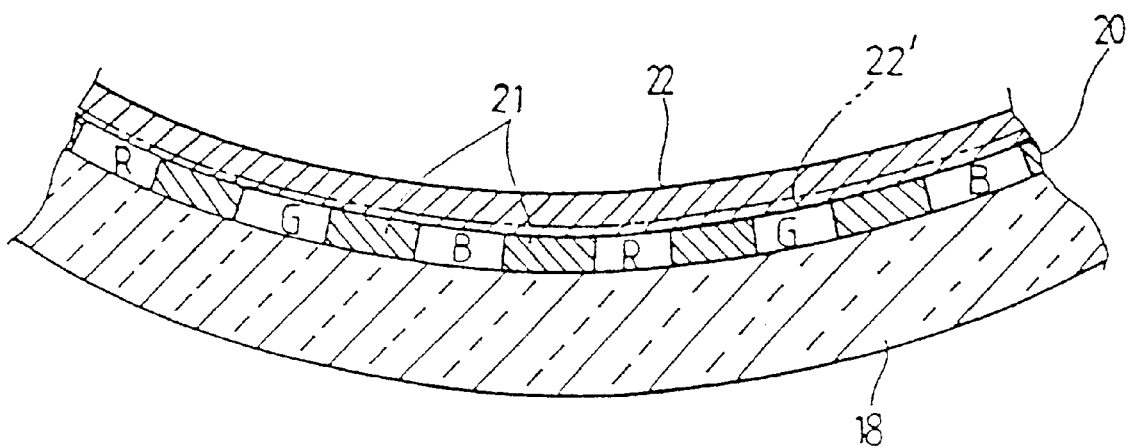
FIG. 2 is an enlarged section of a screen assembly of the tube shown in FIG. 1, and FIGS. 3A through 3E show various steps in dry electrophotographically manufacturing the screen assembly of the tube by viewing a portion of a faceplate having a conductive layer and an overlying photoconductive layer.

The present invention relates to phosphor particles being used particularly in a developing step, as described above, of dry electrophotographic screening process for a CRT. In present invention the surfaces of the phosphor particles are coated easily and uniformly with high-molecular weight organic polymer, i.e., polystyrene in order to improve chargeability and to improve developing characteristics onto photoconductive layers.

According to one embodiment of the present invention, a method for coating phosphor particles used in dry electrophotographic screening process for a CRT comprises steps of agitating, maintaining temperature, injecting initiators, injecting an assistant or co-catalyst, cooling, drying, shattering and filtering.

In the agitating step, phosphor particles of about 40 to 60 weight % with respect to the solvent, and styrene as a monomer of about 20 to 30 weight % with respect to the solvent are injected into a reactor with hexane as a solvent, and than agitated in the reactor. In the temperature-maintaining step, the temperature of the reactor is maintained in 60 degrees of centigrade by heating the reactor by a heating mantle and by transferring cool water through a return current cooler mounted on the reactor.

Then, in the initiator-injecting step, 2,2'-azobisisobutyronitrile (AIBN) ((CN)C(CH3)2N2C(CH3)CN) as first, second and third initiators(catalysts) having same amounts of about 0.02 to 0.5 weight % with respect to the monomer is prepared. At first, the first initiator of AIBN is injected into the reactor. After lapse of one hour from the time of injecting the first initiator, the second initiator is injected into the reactor. Finally, after lapse of two hours from the time of injecting the second initiator, the third initiator is injected into the reactor. In said injecting co-catalyst step, co-catalyst is injected into the reactor after injecting the third initiator. The co-catalyst is cobalt naphthalate of 0.01 to 0.05 weight % with respect to the initiator and dissolved in hexane. After lapse of two hours from injecting the co-catalyst, in the cooling step, the reactor is cooled to room temperature. After completion of the polymerization, in said drying step, the reactor is dried naturally so as to drive off the solvent or monomers remained in the reactor. And then, in the shattering step, the resultant dried phosphor particles are shattered, and in the filtering step, the shattered phosphors particles are filtered with a filter.

After the phosphor particles are injected in the step of agitating, nitrogen gas pressure-controlled by a nitrogen pressure apparatus is injected from an nitrogen bombe, and then the injection of the nitrogen injection is stopped after the cooling step so that the reaction may be executed steadily. Also, the agitating is executed by a mechanical stirrer. The shattering step is executed by a ball milling machine. And in the filtering step, a filter of 100 mesh is used.

The resultant phosphor particles are used in the developing step of dry electrophotographic screening process. From the screening process, the inventor of the present invention discovered that the phosphor particles coated according to present invention are enhanced remarkably in the chargeability of itself and its developing characteristics on the photoconductive layers.

As shown in the below table, the solvent, the phosphor particles, the monomer and the catalyst, and their amounts, which are used in embodiments of the present invention, are described.

| composition | polystyrene [amount (g)] |
| --- | --- |
| solvent | hexane (n-hexane) [100] |
| phosphor | [50] |
| monomer | styrene [25] |
| catalyst (initiator) | AIBN [0.3] |
| co-catalyst | cobalt naphthalate [0.0003] |

In the present embodiment, the n-hexane employed as solvent is that of extra-pure degree available from Dongyang Chemical Co., in Korean industrial company, and the monomers are also employed by that of extra-pure degree not including a suppressing agent of polymerization. The embodiment according to the present invention is performed in following steps.

(1) injecting into a reactor with of the phosphor particles, solvent, and monomers by said amounts, injecting into the reactor with nitrogen gases pressure-controlled by a nitrogen pressure apparatus from an nitrogen bombe, and agitating them in the reactor using a mechanical stirrer, (2) maintaining the temperature of the reactor in 60 degrees of centigrade while heating the reactor by a heating mantle and transferring cool water through a return current cooler mounted on the reactor, (3) preparing first, second and third same initiator (catalyst) having same amounts, injecting into the reactor with the first initiator, injecting into the reactor with the second initiator after lapse of one hour from the time of injecting the first initiator, and finally injecting into the reactor with the third initiator after lapse of two hours from the time of injecting the second initiator, (4) injecting co-catalyst into the reactor after the final initiator injected, co-catalyst being cobalt naphthalate of about 0.01 to 0.05 weight % with respect to the initiator, and being dissolved in hexane, (5) cooling the reactor after lapse of two hours from the injecting co-catalyst, and the injecting of nitrogen gases is stopped, (6) drying naturally after completion of the polymerization so as to drive off the solvent or monomers remained in the reactor, then shattering the resultant dried phosphor particles, hand filtering the shattered phosphor particles with a filter of 100 mesh, The resultant phosphor particles are coated comparatively uniformly. In the case of employing a B phosphor particles having 3 to 10 $\mu$m of diameter, the average molecular weight of the polystyrene is in range of 150,000 to 200,000 at minimum. And the average diameter of the resultant phosphor particles is in range of 5 to 25 $\mu$m.

Then, the phosphor particles' weights are measured before and after burning experiment in a electric furnace, and a coating rate is calculated by the difference of the weights. This coating rate and the amounts of monomers injected into the reaction are compared for calculating of a transfer rate. As a result, it becomes clear that about 10% of the injected monomers have polymerized by the reaction and attached to the surfaces of the phosphor particles.

Meanwhile, according to another embodiment of present invention, a method for manufacturing a screen by dry electrophotographic screening process for a CRT is the same as described above related to FIGS. 3A to 3E. That is, the method comprises the steps of coating a volatilizable photoconductive layer 134 on a volatilizable conductive layer 132 coated on the inner surface of panel 12, charging the photoconductive layer 134 to contain uniformly electrostatic charges, exposing the photoconductive layer 134 selectively by a light source using a shadow mask, and developing the exposed areas of the photoconductive layer with the first phosphor particles according to the present invention which are charged by a discharge electrode 144a, repeating the steps of charging, exposing, and developing for the second and third phosphor particles in a predetermined array structure, and then fixing the developed phosphor particles to the photoconductive layer 134.

In such an dry electrophotographic screening process, when the phosphor particles are coated with organic high molecular polymer, i.e., polystyrene etc., the electric chargeability of the phosphor particles and the attachment (developing) characteristics of the phosphor particles onto the photoconductive layer 134 are enhanced than those of when the phosphor particles are coated by the conventional method which employs only the conventional phosphor particles. Moreover, it is more preferable that the photoconductive layer 134 employs the polystyrene as a high molecular polymeric binder. In this case, since the photoconductive layer 134 and the phosphor particles have the same compounds, the adhesion between the phosphor particles and the photoconductive layer 134 is excellent. Moreover the electrical dischargeability can be enhanced.

As described above, the method for coating phosphor particles, phosphor particles therethrough and dry electrophotographic screening process using them for a CRT according to the present invention is disclosed. The phosphor particles can be coated easily and uniformly with high-molecular weight polymer, polystyrene. And the chargeability and developing characteristics onto photoconductive film of the phosphor particles in dry electrophotographic screening process for a CRT is enhanced remarkably.

It should be clear to one skilled in the art that the present solutions can be altered and applied without any limitation to the aforementioned embodiments of the present invention and within the scope of the present invention's spirit.

What is claimed is:

1. A method for coating phosphor particles with polymers in order to improve chargeability thereof in use for manufacturing a screen on an inner surface of a panel of a CRT, said coating method comprising the steps of:

injecting into a reactor with hexane as a solvent, phosphor particles of about 40 to 60 weight % with respect to the solvent, and styrene as a monomer of about 20 to 30 weight % with respect to the solvent, and agitating them in the reactor;

maintaining the temperature of the reactor in 60 degrees of centigrade by heating the reactor by a heating mantle and by transferring cool water through a return current cooler mounted on the reactor;

preparing 2,2'-azobisisobutyronitrile (AIBN) as first, second and third initiators (catalysts) having same amount of about 0.02 to 0.5 weight % with respect to the monomer, injecting into the reactor with the first initiator, injecting into the reactor with the second initiator after lapse of one hour from the time of injecting the first initiator, and finally injecting into the reactor with the third initiator after lapse of two hours from the time of injecting the second initiator;

injecting co-catalyst dissolved in hexane after the third initiator is injected, co-catalyst being cobalt naphthalate of 0.01 to 0.05 weight % with respect to one of the initiator;

cooling the reactor after lapse of two hours from the injecting of the co-catalyst;

drying naturally after completion of the polymerization so as to drive off the solvent or monomers remained in the reactor;

shattering the resultant dried phosphor particles; and filtering the shattered phosphor particles with a filter.

2. A method according to claim 1 wherein:

the step of agitating comprises at first injecting nitrogen gas controlled in pressure from an nitrogen bombe, and then agitating with a mechanical stirrer;

the step of shattering is executed by a ball milling machine; and the step of filtering uses a filter of around 100 mesh.

3. Phosphor particles used for a dry electrophotographic screening process for a CRT, wherein polystyrene as a high-molecular polymer is coated on the surfaces of the phosphor particles, the phosphor particles being coated with said polystyrene by a method of immersion polymerization, the method comprising:

injecting into a reactor with hexane as a solvent, phosphor particles of about 40 to 60 weight % with respect to the solvent, and styrene as a monomer of about 20 to 30 weight % with respect to the solvent, and agitating them in the reactor;

maintaining the temperature of the reactor in 60 degrees of centigrade by heating the reactor with a hearing mantle any by transferring cool water through a return current cooler mounted on the reactor;

preparing 2,2'-azobisisobutyronitrile (AIBN) as first, second and third initiators (catalysts) having same amount of about 0.02 to 0.5 weight % with respect to the monomer, injecting into the reactor with the first initiator, injecting into the reactor with the second initiator after lapse of one hour from the time of injecting the first initiator, and finally injecting into the reactor with the third initiator after lapse of two hours from the time of injecting the second initiator;

injecting co-catalyst dissolved in hexane after the time of injecting the third initiator, co-catalyst being cobalt naphthalate of about 0.01 to 0.05 weight % with respect to one of the initiator;

cooling the reactor after lapse of two hours from the injecting of the co-catalyst;

drying naturally after completion of the polymerization so as to drive off the solvent and monomers remained in the reactor;

shattering the resultant dried phosphor particles; and filtering the shattered phosphor particles with filter.

4. Phosphor particles according to claim 3, said polystyrene having an average molecular weight of 150,000 to 200,000.

5. A method for manufacturing a screen by dry electrophotographic screening process for a CRT, said method comprising the steps of forming a volatilizable photoconductive layer on a volatilizable conductive layer coated on the inner surface of panel, charging the photoconductive layer to contain uniformly electrostatic charges, exposing the photoconductive layer selectively by a light source using a shadow mask, and developing the exposed areas of the photoconductive layer with one of first to third phosphor particles which are charged by a discharge electrode or a generator of triboelectricity, wherein;

at least one kind of phosphor particles of the first to third phosphor particles used at the developing step are coated with polystyrene as a high-molecular polymer on the surfaces thereof.

6. A method according to claim 5 wherein the phosphor particles are coated with said polystyrene by a method comprising the steps:

injecting into a reactor with hexane as a solvent, phosphor particles of about 40 to 60 weight % with respect to the solvent, and styrene as a monomer of about 20 to 30 weight % with respect to the solvent, and agitating them in the reactor;

maintaining the temperature of the reactor in 60 degrees of centigrade by heating the reactor by a heating mantle and by transferring cool water through a return current cooler mounted on the reactor;

preparing 2,2'-azobisisobutyronitrile (AIBN) as first, second and third initiators (catalysts) having same amount of about 0.02 to 0.5 weight % with respect to the monomer, injecting into the reactor with the first initiator, injecting into the reactor with the second initiator after lapse of one hour from the time of injecting the first initiator, and finally injecting into the reactor with the third initiator after lapse of two hours from the time of injecting the second initiator;

injecting co-catalyst dissolved in hexane after the third initiator is injected, co-catalyst being cobalt naphthalate of 0.01 to 0.05 weight % with respect to one of the initiator;

cooling the reactor after lapse of two hours from the injecting of the co-catalyst;

drying naturally after completion of the polymerization so as to drive off the solvent or monomers remained in the reactor;

shattering the resultant dried phosphor particles; and filtering the shattered phosphor particles with a filter.

7. A method according to claim or claim 5 further comprising repeating the steps of charging, exposing, and developing for two other kinds of phosphor particles of the first to third phosphor particles in a predetermined array structure, and then fixing the developed phosphor particles; and said polystyrene being volatilized at a baking process wherein the panel is baked in air at a temperature of 425 degrees of centigrade for about 30 minutes.

* * * * *